(12) United States Patent
Faivre (10) Patent No.: US 11,505,244 B2
(45) Date of Patent: Nov. 22, 2022

(54) STEERING SYSTEM

(71) Applicant: Caterpillar Inc., Peoria, IL (US)

(72) Inventor: Joseph L. Faivre, Edelstein, IL (US)

(73) Assignee: Caterpillar Inc., Peoria, IL (US)

( * ) Notice: Subject to any disclaimer, the term of this patent is extended or adjusted under 35 U.S.C. 154(b) by 473 days.

(21) Appl. No.: 16/779,895

(22) Filed: Feb. 3, 2020

(65) Prior Publication Data

US 2021/0237797 A1  Aug. 5, 2021

(51) Int. Cl.
| | | |
|---|---|---|
| *B62D 11/02* | (2006.01) | |
| *B62D 15/02* | (2006.01) | |
| *E02F 3/76* | (2006.01) | |
| *E02F 3/84* | (2006.01) | |
| *E02F 9/02* | (2006.01) | |
| *B62D 55/06* | (2006.01) | |
| *B62D 55/26* | (2006.01) | |

(52) U.S. Cl.
CPC ............ *B62D 11/02* (2013.01); *B62D 15/021* (2013.01); *E02F 3/7609* (2013.01); *E02F 3/844* (2013.01); *E02F 9/02* (2013.01); *B62D 55/06* (2013.01); *B62D 55/26* (2013.01); *E02F 3/7604* (2013.01)

(58) Field of Classification Search
CPC ...... B62D 11/02; B62D 15/021; B62D 55/06; B62D 55/26; B62D 11/001; E02F 3/7609; E02F 3/844; E02F 9/02; E02F 3/7604; E02F 3/841; E02F 9/202; E02F 9/2095
See application file for complete search history.

(56) References Cited

U.S. PATENT DOCUMENTS

| | | | |
|---|---|---|---|
| 8,346,450 B2* | 1/2013 | Pohlenz | B60W 10/103 701/87 |
| 8,909,451 B2* | 12/2014 | Kinoshita | F02D 29/02 701/90 |
| 9,573,595 B2* | 2/2017 | Fairgrieve | B60W 10/20 |
| 10,933,742 B2* | 3/2021 | Bittner | B60W 10/119 |
| 2015/0298731 A1* | 10/2015 | Shuler | A01B 69/007 701/41 |
| 2018/0326989 A1 | 11/2018 | Foster et al. | |
| 2021/0314528 A1* | 10/2021 | Krone | B60R 1/00 |

\* cited by examiner

*Primary Examiner* — Kevin Hurley
*Assistant Examiner* — Marlon A Arce
(74) *Attorney, Agent, or Firm* — von Briesen & Roper, s.c.

(57) ABSTRACT

A system and method for steering a machine. The system may comprise a controller configured to receive a steering command and determine a target angular turn rate for the body and a target turn direction for the body. The controller may be further configured to determine a steering mode based on a transmission output torque, the steering mode including Traction-steering, Assisted-steering or Implement-steering. When the steering mode is Assisted-steering, the controller is configured to steer the machine in the target turn direction and at the target angular turn rate by (a) moving an implement from a first position to a second position and (b) diverting or removing power from a first ground engaging traction member. When the steering mode is Implement-steering, the controller is configured to move the implement from a first position to a second position to steer the machine in the target turn direction and at the target angular turn rate without diverting or removing power from the first ground engaging traction member.

20 Claims, 4 Drawing Sheets

STEERING SYSTEM

TECHNICAL FIELD

The present disclosure generally relates to a steering of machine, and more particularly, to systems for steering machines.

BACKGROUND

Loaded machines can be difficult to steer, particularly when the machines utilize tracks, for example track-type tractors. The difficulty in steering tends to occur when steering tracked-machines because the conventional method to steer such machines is to remove or divert power from track on one side of the machine and direct power to the other track. Removing or diverting power from such track results in that track slowing down. Maintaining or adding power to track on the other side of the machine allows the machine to turn or pivot around the slower track but may result in too much torque being applied to the ground underneath the other track which may cause the other track to slip.

US Publication 2018/0326989, published Nov. 15, 2018, discloses a control system configured to receive a first signal indicative of a magnitude of slippage of the off-road vehicle relative to the soil surface and to output a second signal indicative of a first action (e.g., alerting an operator, engaging a four wheel drive system, engaging a differential locking system, etc.). In addition, the control system is configured to output a third signal indicative of a second action, different than the first action, (e.g., reducing a penetration depth of at least one ground engaging tool, stopping the off-road vehicle, etc.) if the magnitude of slippage is greater than a threshold value. A better system is needed.

SUMMARY OF THE DISCLOSURE

In one aspect of the present disclosure, a system for steering a machine is provided. The machine may include a body, an implement coupled to a first frame end of the body, and a plurality of ground-engaging traction members coupled to and supporting the body and configured to propel the machine over a surface. The plurality of ground-engaging traction members may include a first ground-engaging traction member and a second ground engaging traction member disposed opposite to the first ground-engaging traction member. The system may comprise a controller configured to: receive a steering command and determine a target angular turn rate for the body and a target turn direction for the body; determine a steering mode based on a transmission output torque, the steering mode including Traction-steering, Assisted-steering or Implement-steering; when the steering mode is Assisted-steering, steer the machine in the target turn direction and at the target angular turn rate by (a) moving the implement from a first position to a second position and (b) diverting or removing power from the first ground engaging traction member; and when the steering mode is Implement-steering, move the implement from a first position to a second position to steer the machine in the target turn direction and at the target angular turn rate without diverting or removing power from the first ground engaging traction member.

In another aspect of the disclosure, a method for steering a machine is disclosed. The machine may include a controller, a body, an implement coupled to a first end of the body, and a plurality of ground-engaging traction members coupled to and supporting the body and configured to propel the machine over a surface. The plurality of ground-engaging traction members may include a first ground-engaging traction member and a second ground engaging traction member disposed opposite to the first ground-engaging traction member. The method may comprise: receiving, by the controller, a steering command and determining a target angular turn rate for the body and a target turn direction for the body based on the steering command; determining, by the controller, a steering mode based on transmission output torque, the steering mode including Traction-steering, Assisted-steering or Implement-steering; when the steering mode is Assisted-steering, steering the machine in the target turn direction and at the target angular turn rate by (a) moving the implement from a first position to a second position and (b) diverting or removing power from the first ground engaging traction member; and when the steering mode is Implement-steering, moving the implement from a first position to a second position to steer the machine in the target turn direction and at the target angular turn rate without diverting or removing power from the first ground engaging traction member.

In yet another aspect of the disclosure, a system for steering a track-type tractor on a surface is provided. The track-type tractor may include a body, a plurality of tracks coupled to and supporting the body and configured to propel the machine over a surface, and a dozer blade. The plurality of tracks may include a first track and a second track member disposed opposite to the first track. The dozer blade may be mounted on the body between the first track and the second track. The dozer blade is configured to move a load of material. The system may comprise: a user interface and a controller. The user interface is in communication with the controller. The user interface is configured to receive operator input and transmit a steering command based on the operator input. The controller is in operable communication with the plurality of tracks and the dozer blade, and is configured to: receive the steering command from the user interface and determine a target angular turn rate for the body and a target turn direction for the body based on the steering command; determine a steering mode based on a transmission output torque, the steering mode including Traction-steering, Assisted-steering or Implement-steering; when the steering mode is Assisted-steering, steer the machine in the target turn direction and at the target angular turn rate by (a) moving the dozer blade from a first position to a second position and (b) diverting or removing power from the first track; and when the steering mode is Implement-steering, move the dozer blade from the first position to the second position to steer the machine in the target turn direction and at the target angular turn rate without diverting or removing power from the first track.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts, unless otherwise specified.

Figure 1:
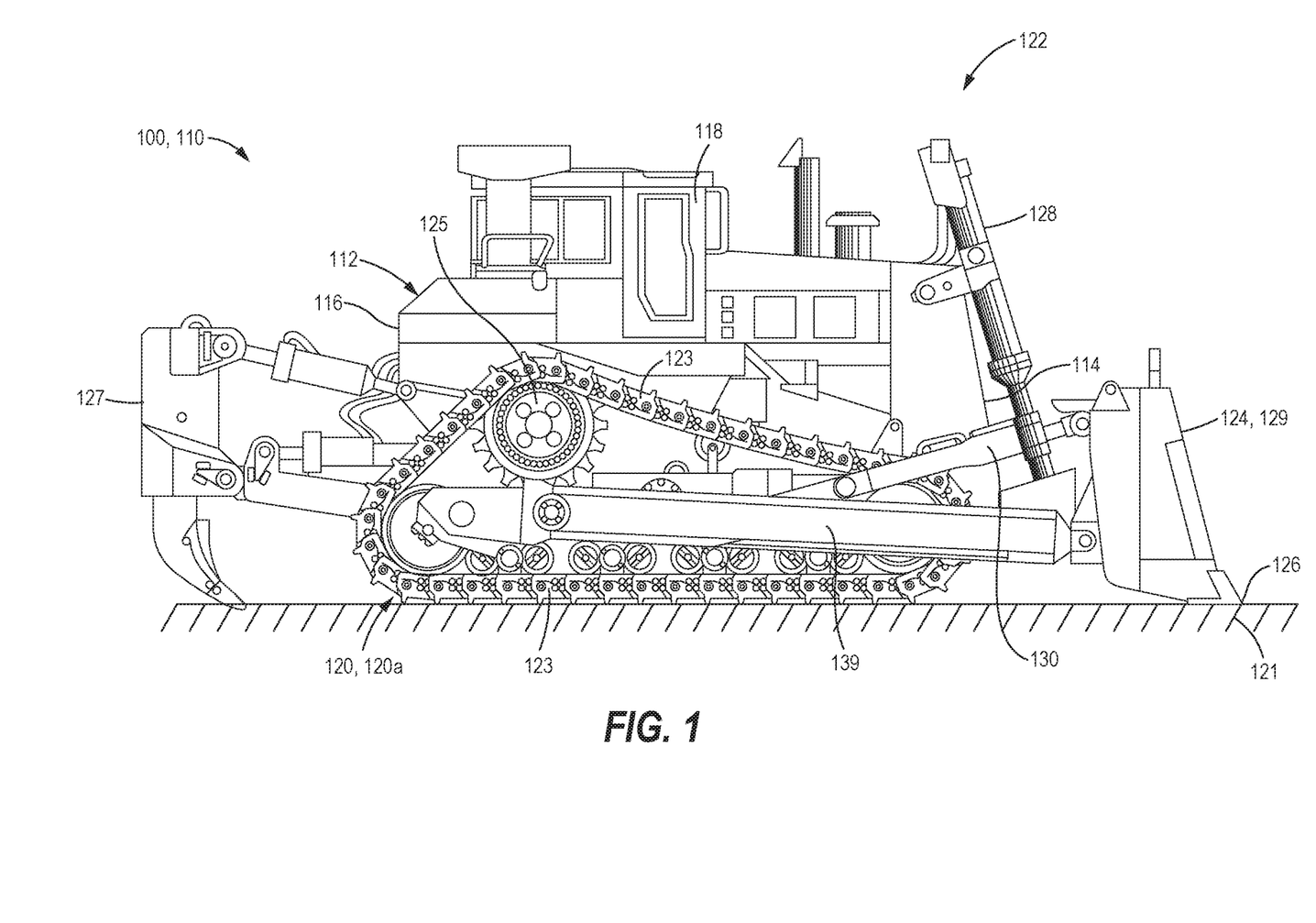
FIG. 1 is a diagrammatic view of an exemplary machine that includes the features disclosed herein.

FIG. 1 illustrates one example of a machine 100 that incorporates the features of the present disclosure. The exemplary machine 100 may be a track-type tractor 110, such as a bull dozer, although the features disclosed herein may be utilized with other types of machines 100. As illustrated in FIG. 1, the track-type tractor 110 may include a body 112 having a first frame end 114 and a second frame end 116. An operator cab 118 is mounted between the first frame end 114 and the second frame end 116, and ground-engaging traction members 120, one of which is visible in the view of FIG. 1, are coupled to and support the body 112 in a generally conventional manner. The ground-engaging traction members 120 are configured to propel the track-type tractor 110 forward/backward over a surface 121 and are typically utilized to steer the track-type tractor 110 (e.g., to the left or the right). The track-type tractor 110 may be a relatively large and heavy duty track-type tractor 110, where ground-engaging traction members 120 may be tracks 120a. In one embodiment, the tracks 120a may include a plurality of track shoes 123 arranged in a high drive configuration, with a drive wheel 125 positioned at a location vertically higher than the front and back idler gears (not numbered). However, the present disclosure is not limited to the high drive configuration.

The track-type tractor 110 further includes a hydraulically actuated implement system 122 including an implement 124 mounted at or toward the first frame end 114. In the illustrated embodiment, the implement 124 shown is a dozer blade 129 of a type suitable for production dozing. The implement 124 has a cutting edge 126 for ground engagement disposed at the bottom of the implement 124. The hydraulically actuated implement system 122 may further include a ground-engaging tool 127 (e.g., a ripper) mounted at or toward the second frame end 116. The hydraulically actuated implement system 122 may further include one or more implement hydraulic actuators 128 operably connected to the implement 124 and configured to raise and lower the implement 124. The hydraulically actuated implement system 122 further includes a pair of hydraulic tilt cylinders 130, disposed on either side of the implement 124, that are operably connected to the implement 124 and are configured to extend and retract to adjust the side-to-side tilt of the implement 124. Such hydraulic tilt cylinders 130 may also be configured to adjust the forward-to-backward pitch of the implement 124. The hydraulically actuated implement system 122 may further include other tool hydraulic actuators that are configured to pivot the tool 127 about a vertical axis, or perform various other adjustments to the position of the tool 127.

Figure 4:
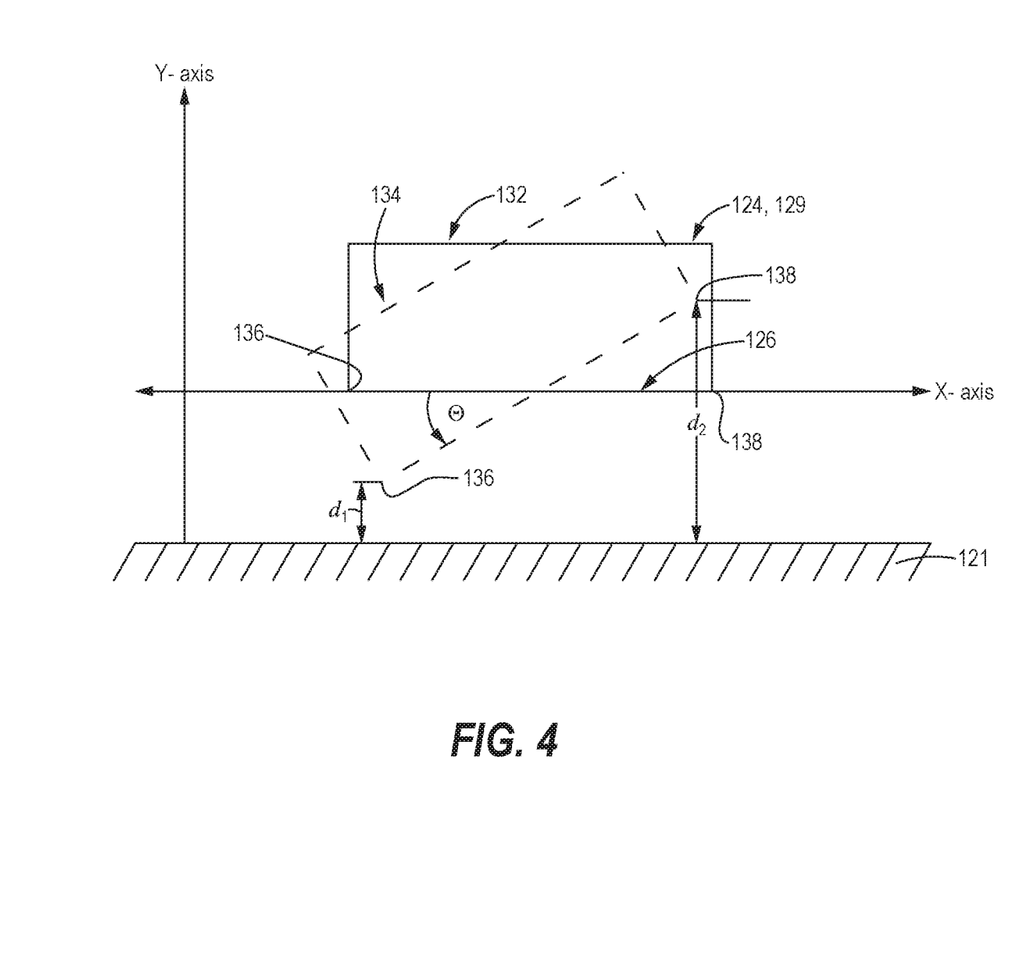
FIG. 4 is a diagrammatic illustration of tilting of an exemplary implement.

FIG. 4 illustrates tilting of an implement 124 from an exemplary first position 132 to an exemplary second position 134 in an embodiment in which the implement 124 is a dozer blade 129. For clarity purposes, FIG. 4 diagrammatically illustrates only the implement 124 (dozer blade 129) and its cutting edge 126. The cutting edge 126 includes a first outer lower corner 136 and a second outer lower corner 138. The first position 132 of the implement 124 is shown in FIG. 4 as the unbroken line. In the embodiment, action of the hydraulic tilt cylinders 130 has moved the implement 124 from the first position 132 to the second position 134 in which first outer lower corner 136 of the cutting edge 126 is now disposed at a lower elevation from the (ground) surface 121 than the second outer lower corner 138 of the cutting edge 126. The second position 134 is shown in broken line in FIG. 4. In other embodiments, either the first outer lower corner 136 or the second outer lower corner 138 may be disposed at a higher or lower elevation (from the (ground) surface 121 on which the track-type tractor 110 is disposed) than the other. For example, in the exemplary embodiment of FIG. 4, first outer lower corner 136 is disposed at an elevation of $d_1$ and second outer lower corner 138 is disposed at an elevation of $d_2$ when the implement 124 is in the second position 134. $D_1$ is a lower elevation than $D_2$. A tilt angle $\theta$ may be measured from a horizontal X-axis for each of the first position 132 and the second position 134. In the embodiment illustrated in FIG. 4, the tilt angle $\theta$ for the first position 132 is 0° and the tilt angle $\theta$ for the second position 134 is 30° from the horizontal X-axis. The horizontal X-axis is parallel to the cutting edge 126 of the implement 124 when the implement 124 is not tilted (when viewed side-to-side across the machine 100 on which it is disposed). As used herein, "tilt" or "tilting" refers to lateral (side-to-side with respect to the body 112 of the machine 100) directed tilting of the cutting edge 126 of the implement 124 in which either the first outer lower corner 136 or the second outer lower corner 138 may be positioned at a higher or lower elevation (from the (ground) surface 121 on which the track-type tractor 110 is disposed) than the other.

Referring now to FIG. 1, on either side of the implement 124 may also be a pair of push arms 139 that connect the implement 124 (e.g., dozer blade 129) to the track-type tractor 110 and accommodate tilting as well as raising and lowering of the implement 124 (dozer blade 129). The implement 124 (e.g., dozer blade 129) may be pivotably connected to the push arms 139 with connectors that permit tilting of the dozer blade 129, and the push arms 139 may be pivotably connected to the body 112.

Figure 2:
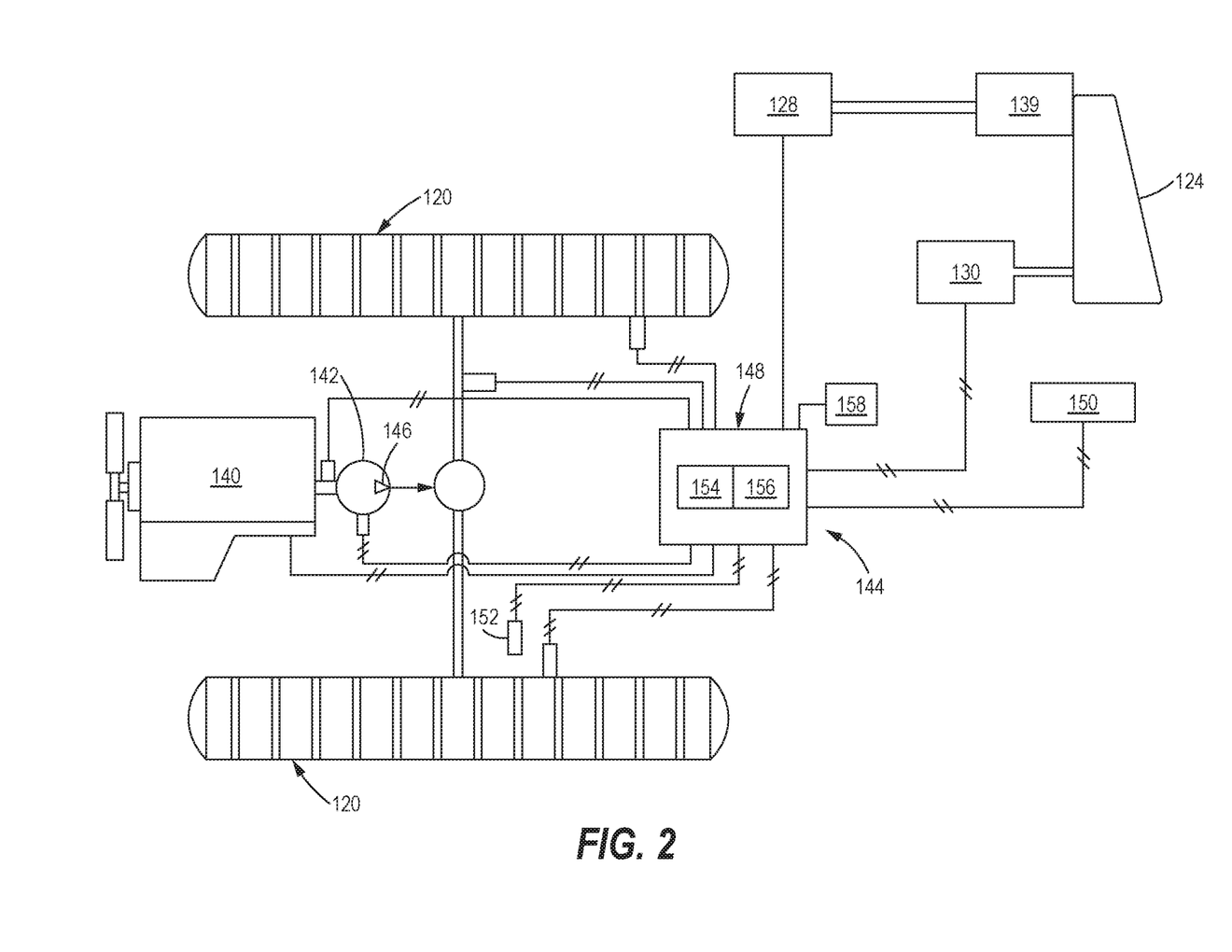
FIG. 2 is a schematic illustration of an exemplary system for the exemplary machine of FIG. 1.

As best illustrated in FIG. 2, the track-type tractor 110 includes an engine 140 and a transmission 142 operably coupling the engine 140 to the ground-engaging traction members 120 (tracks 120a). In FIG. 2, a first track 120a and a second track 120a can be seen. The engine 140 provides, through the transmission 142, power output or torque to the first and second tracks 120a in a generally known manner to rotate the first and second tracks 120a and thereby propel the track-type tractor 110 forward/backward and/or steer the track-type tractor 110 (e.g., to the left or to the right).

The engine 140 may embody an internal combustion engine such as, for example, a diesel engine, a gasoline engine, a gaseous fuel powered engine, or any other type of engine apparent to one skilled in the art. The engine 140 may alternatively or additionally include a non-combustion source of power such as a fuel cell, a power storage device, an electric motor, or other similar mechanism. The engine 140 may be connected to the transmission 142 via a direct mechanical coupling, or in any other suitable manner.

The transmission 142 may include a mechanical transmission, a hybrid hydromechanical transmission, an electric motor drive, or the like. When the transmission 142 includes an electric motor drive (not shown), the transmission 142 may further include a generator (not shown) configured to produce an electrical current used to drive the electric motor associated with any one or all of ground-engaging traction members 120. It should also be appreciated that transmission 142 may include two or more gear ranges or gear ratios for forward travel, and one or more reverse gear ranges or gear ratios.

The machine 100 (e.g., the track-type tractor 110) also includes a system 144 for controlling the steering of the machine 100. The system 144 includes a transmission output torque sensor 146 and a controller 148. The system 144 may further include an user interface 150. The system 144 may also include a turn sensor 152 and an implement position sensor 158.

The transmission output torque sensor 146 is operably associated with the transmission 142 to detect and measure transmission output torque (TOT) of the transmission 142. It is contemplated that alternative techniques for determining TOT may be implemented such as monitoring various parameters of track-type tractor 110 and responsively determining a value of TOT from the transmission 142, or by monitoring a torque command sent to transmission 142. For example, engine speed, transmission output speed, and other parameters may be used, as is well known in the art, to compute TOT for the transmission 142. The transmission output torque sensor 146 is configured to provide to the controller 148 a signal indicative of the transmission output torque.

The turn sensor 152 may be disposed on the machine 100 and is configured to detect and determine the actual angular turn rate and the actual angular turn direction of the machine 100. The turn sensor 152 is configured to provide to the controller 148 the actual angular turn rate and the actual angular turn direction of the machine 100. The turn sensor 152 may include or may be an Inertial Measurement Unit (IMU) or the like.

The implement position sensor 158 may be disposed on the machine 100 and is configured to detect and determine the actual position of the implement 124. The implement position sensor 158 is configured to provide to the controller 148 such actual position. The implement position sensor 158 may include or may be an IMU or an angular sensor.

The user interface 150 may be disposed on the machine 100 or may be remote from the machine 100. The user interface 150 is configured to receive steering input from an operator and to transmit a steering command based on the steering input to the controller 148. In an embodiment, the user interface 150 may be a joy stick, steering wheel, touchscreen, or other appropriate interface for receiving steering input from an operator.

The controller 148 may include a processor 154 and a memory component 156. The controller 148 is in operable communication via communication links with the user interface 150, the transmission output torque sensor 146, the turn sensor 152, the implement position sensor 158, the engine 140, the transmission 142 and the hydraulically actuated implement system 122 (including, the hydraulic tilt cylinders 130 and the hydraulic actuators 128).

The controller 148 is configured to receive the steering command and to determine the target angular turn rate and target turn direction from the steering command. The steering command may be received from the user interface 150. In embodiments in which the machine 100 is autonomously controlled, the controller 148 may receive a steering command from another machine controller configured to generate autonomous steering commands for the machine 100. The controller 148 is also configured to receive the transmission output torque (TOT) from the transmission output torque sensor 146. The controller 148 is also configured to receive the actual angular turn rate and the actual angular turn direction of the machine 100 from the turn sensor 152.

The controller 148 is further configured to determine a steering mode based on the transmission output torque. The steering mode includes Traction-steering, Assisted-steering or Implement-steering. The table below illustrates an exemplary embodiment of the determination of the steering mode according to the method herein. The predetermined thresholds for the TOT may differ between different sizes of machines 100.

| Steering Mode | transmission output torque (TOT) |
| --- | --- |
| Traction-steering | TOT ≤ first threshold |
| Assisted-steering | First threshold < TOT ≤ second threshold |
| Implement-steering | Second threshold < TOT and First threshold < TOT |

The controller 148 is further configured to, when the steering mode is Assisted-steering, steer the machine 100 (e.g., track-type tractor 110) in the target turn direction and at the target angular turn rate by (a) moving the implement 124 (e.g., dozer blade 129) from a first position 132 to a second position 134 and (b) diverting or removing power from a first ground-engaging traction member 120 (e.g., track 120*a*). For example, in an embodiment in which the machine 100 is a track-type tractor 110 and the implement 124 is a dozer blade 129 and the target turn direction is to the right (direction from the perspective of an operator in the cab 118), the controller 148 is configured to (a) move the dozer blade 129 from a first position 132 to a second position 134; and (b) divert or remove power from a first track 120*a* on the right side of the track-type tractor 110. In the second position 134, the first outer lower corner 136 (disposed to the right of the operator from the perspective of the operator in the cab 118) of the cutting edge 126 of the dozer blade 129 is at a lower elevation from the surface 121 than the second outer lower corner 138 of the cutting edge 126 of the dozer blade 129. The amount of power diverted or removed from the ground-engaging traction member 120 (e.g., in the exemplary embodiment above, the first track 120*a*) to assist with steering the machine 100 is related to the target angular turn rate and the contribution to steering (over and above steering provided by the position of the implement 124) to be provided by the ground-engaging traction members 120. If the amount of steering assistance to be provided by the tracks 120*a* is relatively small, a relatively small amount of power will be diverted/reduced from the respective track 120 (e.g., the first track 120*a*) to assist with steering. If a relatively larger amount of steering assistance is to be provided by the tracks 120 (e.g., the first track 120*a*), a larger amount of power will be diverted/removed from the respective track 120 (e.g., the first track 120*a*) to assist with steering.

The controller 148 is further configured to, when the steering mode is Implement-steering, move the implement 124 from a first position 132 to a second position 134 to steer the machine 100 in the target turn direction and at the target angular turn rate without diverting or removing power from the first ground-engaging traction member 120. For example, in an embodiment in which the machine 100 is a track-type tractor 110 and the implement 124 is a dozer blade 129 and the target turn direction is to the right (direction from the perspective of an operator in the cab 118), the controller 148 is configured to move the dozer blade 129 from a first position 132 to a second position 134 to steer the track-type tractor 110 in the target turn direction and at the target angular turn rate without diverting or removing power from the first track 120*a* disposed on the right side (from the perspective of an operator in the cab 118) of the track-type tractor 110. In the second position 134, the first outer lower corner 136 (disposed to the right of the operator from the perspective of the operator in the cab 118)

of the cutting edge 126 of the dozer blade 129 is at a lower elevation from the surface 121 than the second outer lower corner 138 of the cutting edge 126 of the dozer blade 129.

The controller 148 is configured to receive from the implement position sensor 158 the current position of the implement 124 (e.g., the first position 132). The controller 148 is configured to determine the second position 134 for the implement 124 (e.g., dozer blade 129) based on the steering mode (e.g., Assisted-steering or Implement-steering) and the target turn direction and target angular turn rate.

The controller 148 is further configured to, when the steering mode is Traction-steering, steer the machine 100 in the target turn direction and at the target angular turn rate by diverting or removing power from a first ground-engaging traction member 120 (e.g., track 120a) to turn the machine 100. For example, in an embodiment in which the machine 100 is a track-type tractor 110 and the implement 124 is a dozer blade 129 and the target turn direction is to the right (direction from the perspective of an operator in the cab 118), the controller 148 is configured to divert or remove power from a first track 120a disposed on the right side of the track-type tractor 110 to turn the track-type tractor 110 to the right at the target angular turn rate.

The processor 154 may be a microcontroller 148, a digital signal processor (DSP), an electronic control module (ECM), an electronic control unit (ECU), a microprocessor or any other suitable processor 154 as known in the art. The processor 154 may execute instructions and generate control signals for determining the target angular turn rate and target turn direction from the steering command, determining the steering mode and steering the machine 100 based on the steering mode, and comparing the actual angular turn rate and the actual angular turn direction of the machine 100 to the target angular turn rate and target turn direction from the steering command Such instructions may be read into or incorporated into a computer readable medium, such as the memory component 156 or provided external to the processor 154. In alternative embodiments, hard wired circuitry may be used in place of, or in combination with, software instructions to implement a control method.

The term "computer readable medium" as used herein refers to any non-transitory medium or combination of media that participates in providing instructions to the processor 154 for execution. Such a medium may comprise all computer readable media except for a transitory, propagating signal. Common forms of computer-readable media include, for example, a floppy disk, a flexible disk, hard disk, magnetic tape, or any other magnetic medium, a CD-ROM, any other optical medium, or any other computer readable medium.

The controller 148 is not limited to one processor 154 and memory component 156. The controller 148 may include several processors 154 and memory components 156. In an embodiment, the processors 154 may be parallel processors that have access to a shared memory component(s) 156. In another embodiment, the processors 154 may be part of a distributed computing system in which a processor 154 (and its associated memory component 156) may be located remotely from one or more other processor(s) 154 (and associated memory components 156) that are part of the distributed computing system. The controller 148 may also be configured to retrieve from the memory component 156 formulas and other data necessary for the calculations discussed herein.

Figure 3:
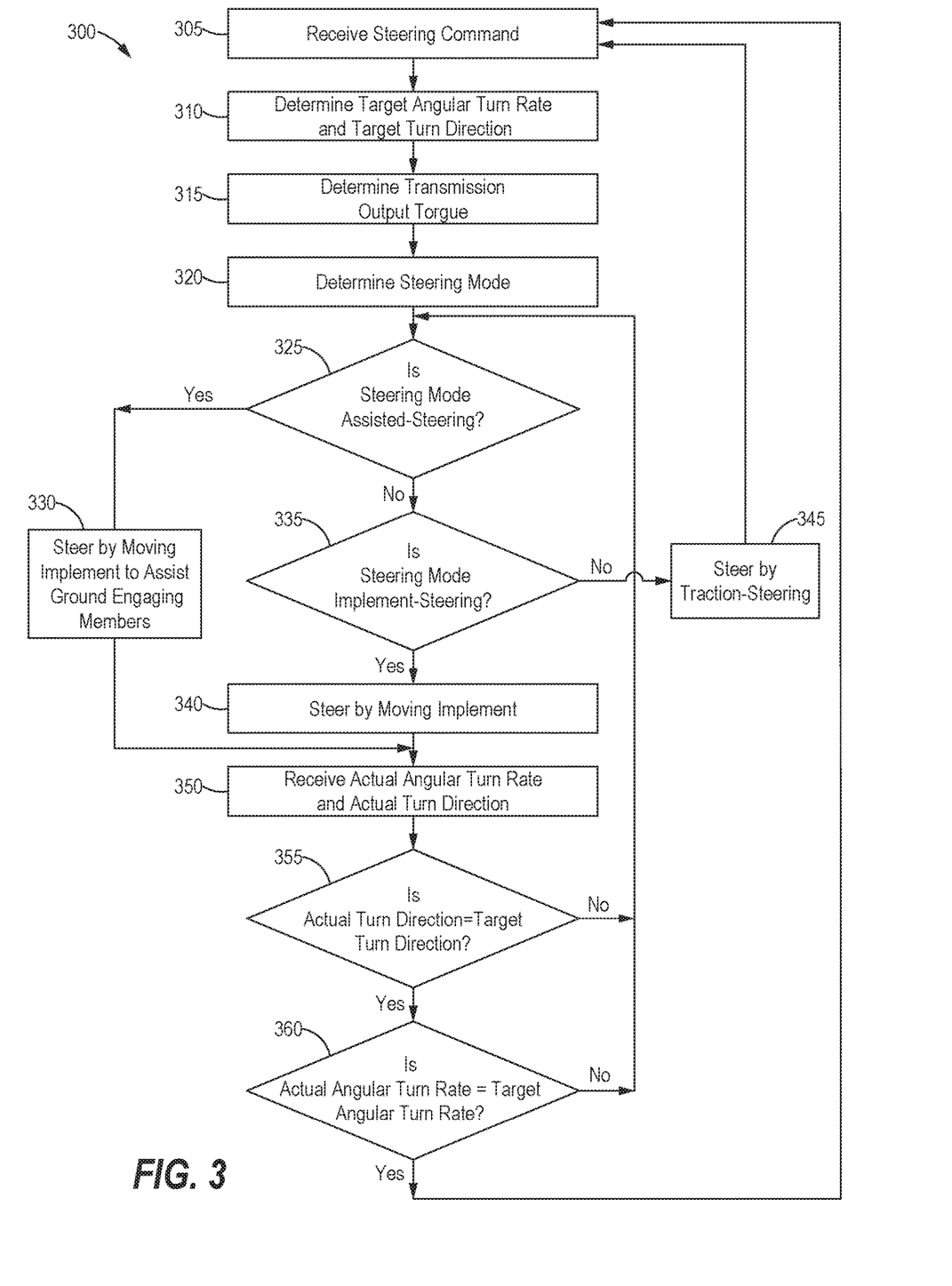
FIG. 3 is a flow diagram of one exemplary method of steering a machine, according to the present disclosure.

Also disclosed is a method 300 for steering a machine 100, the machine 100 including a body 112, an implement 124 coupled to a first frame end 114 of the body 112, a plurality of ground-engaging traction members 120 coupled to and supporting the body 112 and configured to propel the machine 100 over a surface 121, the plurality of ground-engaging traction members 120 including a first ground-engaging traction member 120 and a second ground engaging traction member 120 disposed opposite to the first ground-engaging traction member 120. The method 300 may comprise receiving, by the controller 148, a steering command and determining a target angular turn rate for the body 112 and a target turn direction for the body 112 based on the steering command. The method 300 may further comprise determining, by the controller 148, a steering mode based on transmission output torque, the steering mode including Traction-steering, Assisted-steering or Implement-steering. The method 300 may further comprise steering the machine 100 in the target turn direction and at the target angular turn rate when the steering mode is Assisted-steering by (a) moving the implement 124 from a first position 132 to a second position 134 and (b) diverting or removing power from the first ground engaging traction member 120. The method 300 may further comprise steering the machine 100 in the target turn direction and at the target angular turn rate when the steering mode is Implement-steering by moving the implement 124 from a first position 132 to a second position 134 to steer the machine 100 in the target turn direction and at the target angular turn rate without diverting or removing power from the first ground engaging traction member 120.

INDUSTRIAL APPLICABILITY

FIG. 3 illustrates one exemplary method 300 for steering the machine 100 according to the method 300 disclosed herein. The method 300 may be practiced with more or less than the number of blocks shown and is not limited to the order shown.

In block 305, the controller 148 receives a steering command. The steering command may be received from a user interface 150 that is configured to receive steering input from an operator, and transmit to or make available to the controller 148 a steering command based on the steering input. Alternatively, in an embodiment in which the machine 100 is autonomously controlled, the steering command may be received from a different controller instead of from the user interface 150.

In block 310, the controller 148 determines a target angular turn rate for the body 112 of the machine 100 and a target turn direction for the body 112 of the machine 100.

In block 315, the controller 148 receives a signal indicative of the transmission output torque from the transmission output torque sensor 146 and determines the transmission output torque (value). Alternatively, the controller 148 may receive other data (e.g., engine speed, transmission speed etc.) from other sensors and determine the transmission output torque as is known in the art.

In block 320, the controller 148 determines the steering mode based on the transmission output torque. If the transmission output torque is less than or equal to a first threshold (predetermined value), the steering mode is determined by the controller 148 to be Traction-steering. If the transmission output torque is greater than the first threshold and less than or equal to a second threshold (predetermined value), the steering mode is determined by the controller 148 to be Assisted-steering. If the transmission output torque is greater than the first and second thresholds, the steering mode is determined by the controller 148 to be Implement-steering. In an embodiment, the first threshold and the second threshold may be related to the size of the machine 100. For example the first threshold and the second threshold may be related to a percent of the machine's 100 weight. In one example, the first threshold (value) may be the drawbar pull that is equivalent to 40% of the machine's 100 weight and the second threshold (value) may be the drawbar pull that is equivalent to 65% of the machine's 100 weight. The term "drawbar pull" as used herein refers to the force delivered to the tracks 120. This force may be expended primarily by moving the machine 100, e.g., pushing a load, and by moving material under the ground-engaging traction members 120 (e.g., tracks 120a) in the form of slip. Other force may be expended via friction losses and may be accounted for in drawbar pull. Conversely, energy diverted for other purposes, such as air conditioning, may be outside drawbar pull calculations but may affect overall operation. The calculation for drawbar pull is known in the art and is not discussed further herein.

In block 325, if the controller 148 determines that the steering mode is Assisted-steering, the controller 148 proceeds to block 330.

In block 330, the controller 148 receives from the implement position sensor 158 the current position (e.g., the first position 132) of the implement 124. The controller 148 determines the second position 134 for the implement 124 (e.g., dozer blade 129) based on the steering mode (in this case, Assisted-steering) and the target turn direction and target angular turn rate. The controller steers the machine 100 in the target turn direction and at the target angular turn rate by (a) moving the implement 124 from the first position 132 to the second position 134 and (b) diverting or removing power from a first ground-engaging traction member 120. In other words, the controller 148 steers the machine 100 with a combination of steering provided by diverting or removing power from a first ground-engaging traction member 120 and steering provided by moving the implement 124 from a first position 132 to a second position 134 (e.g., tilting an implement 124 such as a dozer blade 129 or the like). In one embodiment in which the ground-engaging traction members 120 include a first track 120a disposed on a right side of the machine 100 and a second track 120a disposed on a left side of the machine 100 and opposite to the first track 120a, and the implement 124 is a dozer blade 129, the controller 148 may steer the machine 100 to the right by tilting a first outer lower corner 136 (disposed on the right-hand side) of the cutting edge 126 of the dozer blade 129 downward (relative to the second outer lower corner 138 disposed on the opposing left-hand side of the cutting edge 126) to a lower elevation than the second outer lower corner 138 and diverting or removing power from the first track 120a so that the machine 100 begins to turn or pivot to the right about the first track 120a at the target angular turn rate.

In block 335, if the controller 148 determines that the steering mode is Implement-steering, the controller 148 proceeds to block 340.

In block 340, the controller 148 receives from the implement position sensor 158 the current position (e.g., the first position 132) of the implement 124. The controller 148 determines the second position 134 for the implement 124 (e.g., dozer blade 129) based on the steering mode (in this case, Implement-steering) and the target turn direction and target angular turn rate. The controller 148 moves the implement 124 from a first position 132 to a second position 134 to steer the machine 100 in the target turn direction and at the target angular turn rate and steers the machine 100 without diverting or removing power from a ground-engaging traction member 120. For example, in one embodiment in which the ground-engaging traction members 120 include a first track 120a disposed on a right side of the machine 100 and a second track 120a disposed on a left side of the machine 100 and opposite to the first track 120a, and the implement 124 is a dozer blade 129, the controller 148 may steer the machine 100 in the target turn direction (in this embodiment, to the right of the machine 100) by tilting a first outer lower corner 136 (disposed on the right-hand side) of the cutting edge 126 of the dozer blade 129 downward to a lower elevation than the second outer lower corner 138 disposed on the opposing left-hand side of the cutting edge 126 so that the machine 100 pivots about the (right) first track 120a of the machine 100 at the target angular turn rate. When the steering mode is Implement-steering, the controller 148 does not cause power to be diverted or removed from the ground-engaging traction member 120 (e.g., the first track 120a) in order to steer the machine 100.

In block 345, if the transmission output torque is determined to be less than or equal to the first threshold, the controller 148 uses traction steering to steer the machine 100. For example, the controller 148 may diverting or removing power from a first ground-engaging traction member 120 to steer the machine 100 so that the machine 100 turns or pivots about that first ground-engaging traction member 120, as is known in the art.

In block 350, the controller 148 receives from the turn sensor 152 the actual turn direction of the machine 100 and the actual angular turn rate of the machine 100.

In block 355, the controller 148 compares the actual turn direction to the target turn direction. If the actual turn direction is different than the target turn direction, the process may proceed to block 325.

In block 360, the controller 148 compares the actual angular turn rate to the target angular turn rate. If the actual angular turn rate is different than the target angular turn rate, the process may proceed to block 325.

In general, the foregoing disclosure finds utility in various applications relating to control of machines 100. More specifically, the disclosed system 144 and method 300 may be used to provide steering or steering assistance that minimizes slip for machines 100.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A system for steering a machine, the machine including a body, an implement coupled to a first frame end of the body, and a plurality of ground-engaging traction members coupled to and supporting the body and configured to propel the machine over a surface, the plurality of ground-engaging traction members including a first ground-engaging traction member and a second ground engaging traction member disposed opposite to the first ground-engaging traction member, the system comprising:
   a controller configured to:
      receive a steering command and determine a target angular turn rate for the body and a target turn direction for the body;
      determine a steering mode based on a transmission output torque, the steering mode including Traction-steering, Assisted-steering or Implement-steering;

when the steering mode is Assisted-steering, steer the machine in the target turn direction and at the target angular turn rate by (a) moving the implement from a first position to a second position and (b) diverting or removing power from the first ground engaging traction member;

when the steering mode is Implement-steering, move the implement from a first position to a second position to steer the machine in the target turn direction and at the target angular turn rate without diverting or removing power from the first ground engaging traction member.

2. The system of claim 1, wherein the implement is a blade configured to push material.

3. The system of claim 2, wherein the machine is a track-type tractor and each of the plurality of ground-engaging traction members includes a track comprising plurality of track shoes driven by a drive wheel.

4. The system of claim 2, wherein the steering mode is Assisted-steering when the transmission output torque is (a) greater than a first threshold and (b) less than or equal to a second threshold, the second threshold greater than the first threshold.

5. The system of claim 4, wherein the steering mode is Implement-steering when the transmission output torque is greater than the second threshold.

6. The system of claim 2, in which the system further includes a user interface in communication with the controller and configured to receive operator input and transmit a steering command to the controller based on the operator input.

7. The system of claim 2, when the steering mode is Implement-steering, move the implement from a first position to a second position includes tilting the blade from the first position to the second position.

8. The system of claim 2, when the steering mode is Assisted-steering, move the implement from a first position to a second position includes tilting the blade from the first position to the second position.

9. A method for steering a machine, the machine including a controller, a body, an implement coupled to a first end of the body, and a plurality of ground-engaging traction members coupled to and supporting the body and configured to propel the machine over a surface, the plurality of ground-engaging traction members including a first ground-engaging traction member and a second ground engaging traction member disposed opposite to the first ground-engaging traction member, the method comprising:

receiving, by the controller, a steering command and determining a target angular turn rate for the body and a target turn direction for the body based on the steering command;

determining, by the controller, a steering mode based on transmission output torque, the steering mode including Traction-steering, Assisted-steering or Implement-steering;

when the steering mode is Assisted-steering, steering the machine in the target turn direction and at the target angular turn rate by (a) moving the implement from a first position to a second position and (b) diverting or removing power from the first ground engaging traction member; and when the steering mode is Implement-steering, moving the implement from a first position to a second position to steer the machine in the target turn direction and at the target angular turn rate without diverting or removing power from the first ground engaging traction member.

10. The method according to claim 9, wherein the implement is a blade configured to push material.

11. The method according to claim 10, wherein the machine is a track-type tractor and each ground-engaging traction member includes a track comprising a plurality of track shoes driven by a drive wheel.

12. The method according to claim 10, wherein the steering mode is Assisted-steering when the transmission output torque is (a) greater than a first threshold and (b) less than or equal to a second threshold, the second threshold greater than the first threshold.

13. The method according to claim 12, wherein the steering mode is Implement-steering when the transmission output torque is greater than the second threshold.

14. The method according to claim 10, wherein the steering command is based on operator input to a user interface.

15. A system for steering a track-type tractor on a surface, the track-type tractor including a body, a plurality of tracks coupled to and supporting the body and configured to propel the machine over a surface, the plurality of tracks including a first track and a second track member disposed opposite to the first track, and a dozer blade mounted on the body between the first track and the second track, the dozer blade configured to move a load of material, the system comprising:

a user interface in communication with a controller, the user interface configured to receive operator input and transmit a steering command based on the operator input; and the controller in operable communication with the plurality of tracks and the dozer blade, the controller configured to:

receive the steering command from the user interface and determine a target angular turn rate for the body and a target turn direction for the body based on the steering command;

determine a steering mode based on a transmission output torque, the steering mode including Traction-steering, Assisted-steering or Implement-steering;

when the steering mode is Assisted-steering, steer the machine in the target turn direction and at the target angular turn rate by (a) moving the dozer blade from a first position to a second position and (b) diverting or removing power from the first track; and when the steering mode is Implement-steering, move the dozer blade from the first position to the second position to steer the machine in the target turn direction and at the target angular turn rate without diverting or removing power from the first track.

16. The system according to claim 15, in which the controller is further configured to receive transmission output torque from a transmission output torque sensor disposed on the track-type tractor.

17. The system according to claim 15, in which the steering mode is Assisted-steering when the transmission output torque is (a) greater than a first threshold and (b) less than or equal to a second threshold, the second threshold greater than the first threshold.

18. The system according to claim 17, in which the steering mode is Implement-steering when the transmission output torque is greater than the second threshold.

19. The system according to claim 17, in which the steering mode is Traction-steering when the transmission output torque is less than or equal to the first threshold.

20. The system according to claim 15, the controller is further configured to:
- receive from a turn sensor the actual rate of turning of the body of the machine and the actual turn direction;
- compare the target angular turn rate to the actual angular turn rate;
- when the steering mode is Implement-steering, if the actual angular turn rate is different than or changes from the target angular turn rate, adjust the second position of the dozer blade to a third position to steer the track-type tractor in the target turn direction and at the target angular turn rate.

* * * * *